(12) United States Patent
Iizaka

(10) Patent No.: US 6,654,047 B2
(45) Date of Patent: *Nov. 25, 2003

(54) METHOD OF AND DEVICE FOR ACQUIRING INFORMATION ON A TRAFFIC LINE OF PERSONS

(75) Inventor: Hitoshi Iizaka, Fuji (JP)

(73) Assignee: Toshiba Tec Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/422,003

(22) Filed: Oct. 20, 1999

(65) Prior Publication Data

US 2003/0164878 A1 Sep. 4, 2003

(30) Foreign Application Priority Data

Oct. 27, 1998 (JP) .......................................... 10-305431
Sep. 6, 1999 (JP) .......................................... 11-251592

(51) Int. Cl.⁷ .............................................. H04N 7/18
(52) U.S. Cl. ..................... 348/143; 382/103; 348/169
(58) Field of Search .......................... 348/143; 382/103, 382/116, 118

(56) References Cited

U.S. PATENT DOCUMENTS

| | | | |
|---|---|---|---|
| 5,274,714 A | * 12/1993 | Hutcheson et al. | 382/157 |
| 5,465,115 A | 11/1995 | Conrad et al. | |
| 5,550,928 A | * 8/1996 | Lu et al. | 382/103 |
| 6,054,928 A | * 4/2000 | Lemelson et al. | 340/539 |
| 6,430,306 B2 | * 8/2002 | Slocum et al. | 382/118 |
| 2001/0000025 A1 | * 3/2001 | Darrell et al. | 382/103 |

FOREIGN PATENT DOCUMENTS

| | | |
|---|---|---|
| JP | 7-23452 | 1/1995 |
| JP | 7-249138 | 9/1995 |

* cited by examiner

*Primary Examiner*—Chris Kelley
*Assistant Examiner*—George A Bugg
(74) *Attorney, Agent, or Firm*—Frishauf, Holtz, Goodman & Chick, P.C.

(57) ABSTRACT

A feature vector creating section creates a feature vector unique to a customer on the basis of the images of a person picked up by cameras in a store. An entrance information storage section stores entrance information obtained by adding the identification code, entrance time, etc. to the feature vector of the incoming person. A customer collating section collates the feature vector of a person leaving and moving around the store with the feature vectors stored in the entrance information storage section. When the collation has found the same customer, the customer's identification code, pickup time, pickup place, and others are stored as traffic-line information into a traffic-line storage section. The route that a customer took is found by picking up pieces of the traffic-line information with the same identification code.

20 Claims, 12 Drawing Sheets

| IDENTIFICATION ID | ENTRANCE TIME | POSITION INFORMATION | FEATURE VECTOR |
|---|---|---|---|
| 100001 | 10:00 | CAMERA 5a | $X_1$ |
| 100002 | 10:00 | CAMERA 5b | $X_2$ |
| 100003 | 10:01 | CAMERA 5a | $X_3$ |
| 100004 | 10:01 | CAMERA 5b | $X_4$ |

FIG. 5

| IDENTIFICATION ID | PASSING TIME | POSITION INFORMATION |
|---|---|---|
| 100001 | 10:01 | CAMERA 7a |
| 100002 | 10:01 | CAMERA 7e |
| 100003 | 10:02 | CAMERA 7a |
| 100004 | 10:02 | CAMERA 7e |
| 100001 | 10:03 | CAMERA 7h |
| 100004 | 10:03 | CAMERA 7o |
| 100001 | 10:06 | CAMERA 7s |
| 100001 | 10:10 | CAMERA 7h |
| 100001 | 10:15 | CAMERA 6a |

FIG. 6

| 12c |
|---|
| FEATURE VECTOR FOR MEN IN THEIR TWENTIES |
| FEATURE VECTOR FOR MEN IN THEIR THIRTIES |
| FEATURE VECTOR FOR MEN IN THEIR FORTIES |
| FEATURE VECTOR FOR MEN IN THEIR FIFTIES |
| FEATURE VECTOR FOR MEN IN THEIR SIXTIES OR HIGHER |
| FEATURE VECTOR FOR WOMEN IN THEIR TWENTIES |
| FEATURE VECTOR FOR WOMEN IN THEIR THIRTIES |
| FEATURE VECTOR FOR WOMEN IN THEIR FORTIES |
| FEATURE VECTOR FOR WOMEN IN THEIR FIFTIES |
| FEATURE VECTOR FOR WOMEN IN THEIR SIXTIES OR HIGHER |

FIG. 10

| IDENTIFICATION ID | ENTRANCE TIME | POSITION INFORMATION | FEATURE VECTOR | SEX | AGE |
|---|---|---|---|---|---|
| | | | | | |
| | | | | | |

D1 (VISIT DATE: 99.8.22)

| IDENTIFICATION ID | ENTRANCE TIME | POSITION INFORMATION | FEATURE VECTOR | PRECEDING VISIT DATE | PRECEDING IDENTIFICATION ID |
|---|---|---|---|---|---|
| 0001 | 10:00 | CAMERA 5a | Xb1 | 99.7.10 | 0052 |
| 0002 | 10:00 | CAMERA 5b | Xb2 | | |
| 0003 | 10:01 | CAMERA 5a | Xb3 | | |
| 0004 | 10:01 | CAMERA 5a | Xb4 | 99.7.12 | 1302 |
| 0005 | 10:01 | CAMERA 5b | Xb5 | | |
| 0006 | 10:02 | CAMERA 5a | Xb6 | 99.7.9 | 1004 |

D1 (VISIT DATE: 99.8.21)

| IDENTIFICATION ID | ENTRANCE TIME | POSITION INFORMATION | FEATURE VECTOR | PRECEDING VISIT DATE | PRECEDING IDENTIFICATION ID |
|---|---|---|---|---|---|
| 0001 | 10:00 | CAMERA 5a | Xc1 | | |
| 0002 | 10:00 | CAMERA 5b | Xc2 | 99.7.2 | 0401 |
| 0003 | 10:00 | CAMERA 5b | Xc3 | | |
| 0004 | 10:01 | CAMERA 5a | Xc4 | 99.7.13 | 0523 |
| 0005 | 10:01 | CAMERA 5a | Xc5 | 99.7.10 | 1102 |
| 0006 | 10:01 | CAMERA 5a | Xc6 | | |
| 0007 | 10:02 | CAMERA 5b | Xc7 | | |

FIG. 14B

D2 (VISIT DATE: 99.8.22)

| IDENTIFICATION ID | PASSING TIME | POSITION INFORMATION |
|---|---|---|
| 0002 | 10:01 | CAMERA 7e |
| 0001 | 10:01 | CAMERA 7e |
| 0004 | 10:01 | CAMERA 7e |
| 0003 | 10:02 | CAMERA 7i |
| 0001 | 10:02 | CAMERA 7m |
| 0003 | 10:03 | CAMERA 7s |
| 0004 | 10:03 | CAMERA 7p |

D2 (VISIT DATE: 99.8.21)

| IDENTIFICATION ID | PASSING TIME | POSITION INFORMATION |
|---|---|---|
| 0001 | 10:00 | CAMERA 7e |
| 0002 | 10:01 | CAMERA 7e |
| 0003 | 10:01 | CAMERA 7e |
| 0005 | 10:01 | CAMERA 7i |
| 0004 | 10:01 | CAMERA 7d |
| 0001 | 10:02 | CAMERA 7d |
| 0002 | 10:02 | CAMERA 7s |

| IDENTIFICATION ID | ENTRANCE TIME | POSITION INFORMATION | FEATURE VECTOR | PREVIOUS VISIT DATE | PREVIOUS IDENTI- FICATION ID |
|---|---|---|---|---|---|
| 0001 | 10:00 | CAMERA 5a | Xa1 | 99.7.22 | 0051 |
| 0002 | 10:00 | CAMERA 5a | Xa2 | | |

FIG. 18A

| VISIT DATE | IDENTIFICATION ID | ENTRANCE TIME | POSITION INFORMATION | FEATURE VECTOR | SEX | AGE |
|---|---|---|---|---|---|---|
| | | | | | | |

| VISIT DATE | IDENTIFICATION ID | PASSING TIME | POSITION INFORMATION |
|---|---|---|---|
| | | | |

D12

METHOD OF AND DEVICE FOR ACQUIRING INFORMATION ON A TRAFFIC LINE OF PERSONS

BACKGROUND OF THE INVENTION

This invention relates to a method of and device for acquiring information on the traffic line of persons to grasp the situation where persons are moving around facilities, such as traffic-line information to grasp the routes of customers moving around a store, such as a department store or a supermarket.

Jpn. Pat. Appln. KOKAI Publication No. 7-23452 has disclosed a system for acquiring data on the traffic line of persons. In the system, which uses radio transmitting/receiving devices, transmission means for periodically transmitting location data on their installation locations are provided in positions that prevent the transmitting regions from overlapping with each other. The position data from each transmission means is received by reception means. The reception means memorizes the position data and the time when the position data was received. The position data and time data the reception means has memorized are acquired by data acquisition means. The data acquisition means determines a traffic line by causing data analyzing means to analyze the acquired position data and time data. Specifically, providing reception means for a moving body enables the reception means to receive the position data from the transmission means each time the moving body enters the transmitting area of the transmission means and memorize the position data and time data. This makes it possible to grasp when and where the moving body has passed and acquire data on the traffic line of the moving body.

When such a traffic-line data acquiring system is applied to the acquisition of information on the movement of customers in a large store, the reception means are not easy to use, because customers have to carry the means with them or put the means on the carts or their shopping baskets. In addition, since the reception means are separated from each other, when the data acquisition means acquires the position data and time data stored in each reception means, the efficiency of data acquisition is low, because the acquisition means has to connect to each reception means and acquire those data items.

BRIEF SUMMARY OF THE INVENTION

A first object of the present invention is to provide a method of and device for automatically acquiring information on the traffic line of persons efficiently without imposing any burden on persons, such as customers.

A second object of the present invention is to provide a method of and device for automatically acquiring information on the traffic line of persons by attribute.

A third object of the present invention is to provide a method of and device for automatically acquiring not only information on the traffic line of persons but also visit patterns, including the frequency of visits of persons and their visit time.

A fourth object of the present invention is to provide a method of and device for automatically acquiring not only information on the traffic line of persons but also information on the traffic line at the time when persons visited in the past.

A fifth object of the present invention is to provide a method of and device for automatically acquiring not only information on the traffic line of persons but also information on the traffic line of persons by attribute and the past visit pattern of persons by attribute.

A sixth object of the present invention is to provide a method of and device for automatically acquiring not only information on the traffic line of persons but also information on the traffic line of persons by attribute, the past visit pattern of persons by attribute, and the past traffic line by attribute.

A seventh object of the present invention is to provide a method of and device for acquiring information on the traffic line of persons which assure a high discrimination rate of persons.

An eighth object of the present invention is to provide a method of and device for acquiring information on the traffic line of persons which speed up collation and reduce the storage capacity.

In order to achieve the above objects, according to one aspect of the present invention, there is provided a method of acquiring information on the traffic line of persons representing the routes that the persons take, comprising the steps of: sensing the existence of a person and extracting the person's image from the images picked up by image pickup devices which are provided in facilities and pick up persons entering, leaving, and moving around the facilities; creating a feature vector unique to the person by subjecting the person's image extracted in the person's image extracting step to an image process; adding information including the identification code and entrance time of the person to the feature vector created from the person's image picked up at the time of entrance to create entrance information and storing the entrance information; collating the feature vector created from the image of the person leaving and moving around the facilities with the feature vector contained in the entrance information; storing traffic-line information including the identification code of the person, pickup time, and pickup place, when the same person is discriminated in the collating step; and acquiring traffic-line information with the same identification code from the traffic-line information stored in the traffic-line information storing step and providing the route of each person moving around the facilities.

Since the entrance, exit, and movement in facilities of a person are all picked up by the image pickup devices, the identification code is added to the person's image picked up, and pieces of information with the same identification code are totalized to produce the traffic line of the customer, information on the traffic line of the customer can be automatically acquired efficiently without imposing any burden on the customer.

The person's image extracting step is to extract only the person's face image and the feature vector creating step is to create lower-dimensional vectors by principal component analysis. Consequently, the discrimination rate of persons is increased, the collation is effected at higher speed, and the storage capacity is reduced.

The method of the invention further comprises the step of collating the feature vector created from the person's image picked up at the time of entrance with the feature vectors by attribute for persons previously stored and judging the attribute of the person, wherein the step of storing the entrance information includes the step of storing entrance information including the attribute of the person, and the step of providing the routes includes the step of providing the routes by attribute. Therefore, information on the traffic line of person's attributes, including sex and age group, is also acquired automatically.

The method of the invention further comprises the step of providing a visit pattern including tendency data on the frequency of visits and visit time of the same person by using past visit information.

The method of the invention further comprises the step of preserving past traffic-line information obtained by adding a visit date to the traffic-line information, wherein the step of acquiring the traffic-line information includes the step of referring to the past traffic-line information and providing the past route of each of the persons moving around the facilities. This makes it possible to automatically acquire the traffic-line information at the time when the person visited the facilities.

The method of the invention further comprises the step of collating the feature vector created from the person's image picked up at the time of entrance with the feature vectors by attribute for persons previously stored and judging the attribute of the person, the step of preserving past visit information obtained by adding the attribute of the person and the visit date to the entrance information, and the step of collating the feature vector created from the person's image picked up at the time of entrance with the feature vectors included in the past visit information, wherein the step of storing the entrance information includes the step of storing entrance information including the past visit date and preceding identification code of the person, when the same person has been identified in the past visit information collating step. This makes it possible to automatically acquire past visit patterns by attribute for persons.

The method of the invention further comprises the step of preserving past traffic-line information obtained by adding a visit date to the traffic-line information, wherein the step of acquiring the traffic-line information includes the step of referring to the past traffic-line information and past visit information and providing the past route by the attribute of each of the persons moving around the facilities. This makes it possible to automatically acquire past traffic-line information by attribute for persons.

Furthermore, the present invention provides a traffic-line information acquiring device using the above methods. According to still another aspect of the present invention, there is provided a device for acquiring information on the traffic line of persons representing the routes that the persons take, comprising: image pickup means which are provided in facilities and pick up persons entering, leaving, and moving around the facilities; means for sensing the existence of a person from the images picked up by the image pickup means and extracting the person's image; means for creating a feature vector unique to the person by subjecting the person's image extracted by the person's image extracting means to an image process; means for adding information including the identification code and visit time of the person to the feature vector created from the person's image picked up at the time of entrance to create entrance information and storing the entrance information; means for collating the feature vector created from the image of the person leaving and moving around the facilities with the feature vector contained in the entrance information; means for storing traffic-line information including the identification code, pickup time, and pickup place of the person, when the same person is discriminated by the collating means; and means for acquiring traffic-line information with the same identification code from the traffic-line information stored by the traffic-line information storing means and providing the route of each person moving around the facilities.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 shows an example of data the entrance information storage section memorizes in FIG. 3;

FIG. 6 shows an example of data the traffic line information storage section memorizes in FIG. 3;

FIG. 10 shows an example of attribute information the attribute information storage section memorizes in FIG. 8;

FIG. 11 shows an example of data the entrance information storage section memorizes in FIG. 8;

FIGS. 14A and 14B show examples of data the past visit information storage section memorizes in FIG. 13;

FIGS. 18A and 18B show examples of data the past visit information storage section memorizes in FIG. 17.

DETAILED DESCRIPTION OF THE INVENTION

Embodiments of the present invention will be explained by reference to the accompanying drawings. The embodiments will be described, giving an example of acquiring information on traffic line to grasp the routes of customers or persons moving around a store, such as a department store or a supermarket.

First Embodiment

Figure 1:
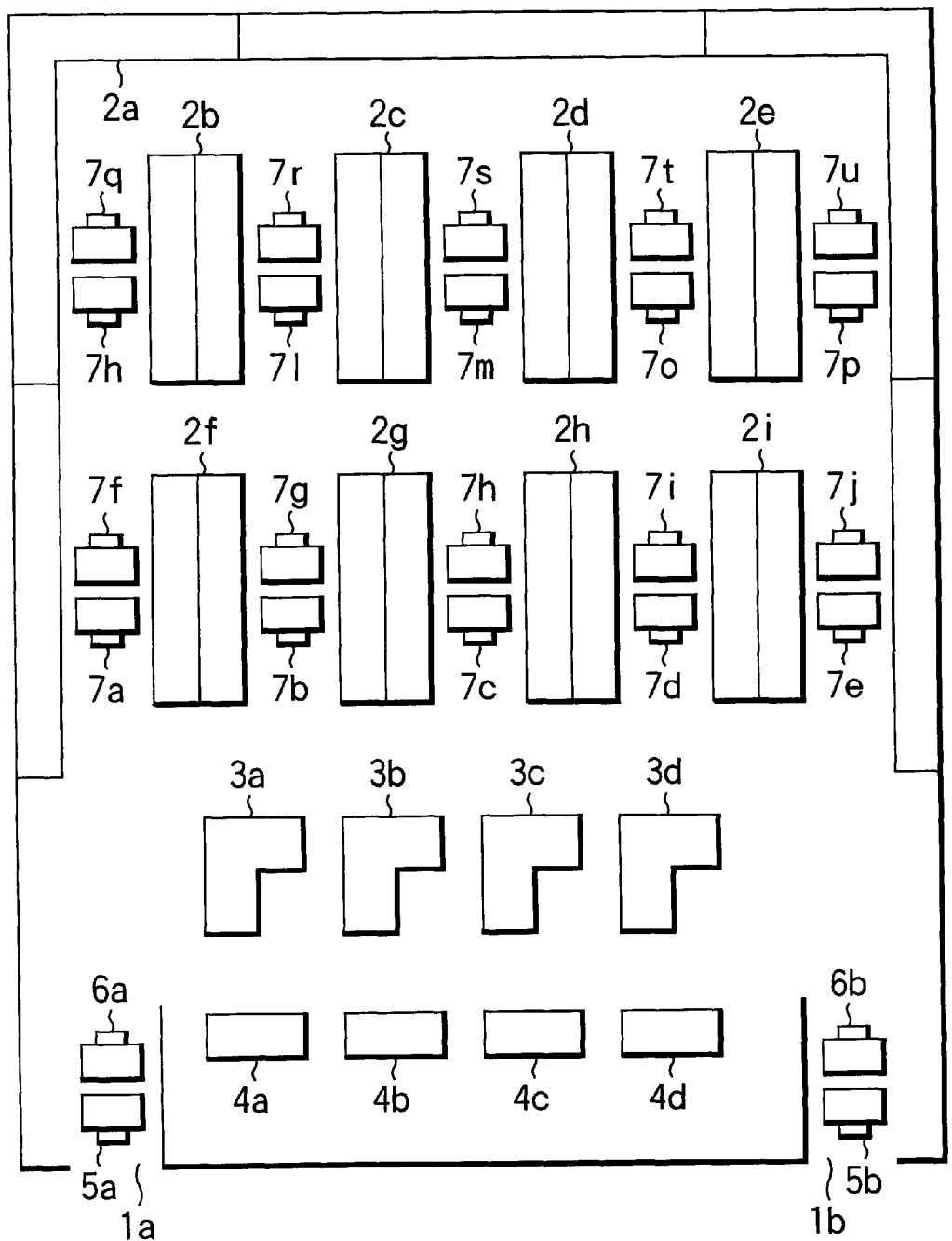
FIG. 1 shows a camera layout in a store to which the present invention is applied.

FIG. 1 shows a camera layout in a store to which the present invention is applied. Reference symbols 1a, 1b indicate doorways for customers to go in and out of the sales area, 2a to 2i display racks on which goods are displayed, 3a to 3d checkout counters on which POS (point-of-sails) terminals and others are provided, and 4a to 4d sacker tables on which customers put their purchased things in the bags.

Above each of the doorways 1a, 1b, not only are incomer cameras 5a, 5b provided as image pickup means for picking up incoming customers, but also outgoer cameras 6a, 6b are provided as image pickup means for picking up outgoing customers. Above the aisles formed by the display racks 2a to 2i, mover cameras 7a to 7u are provided as image pickup means for picking up the situation where customers are moving around the store.

Figure 2:
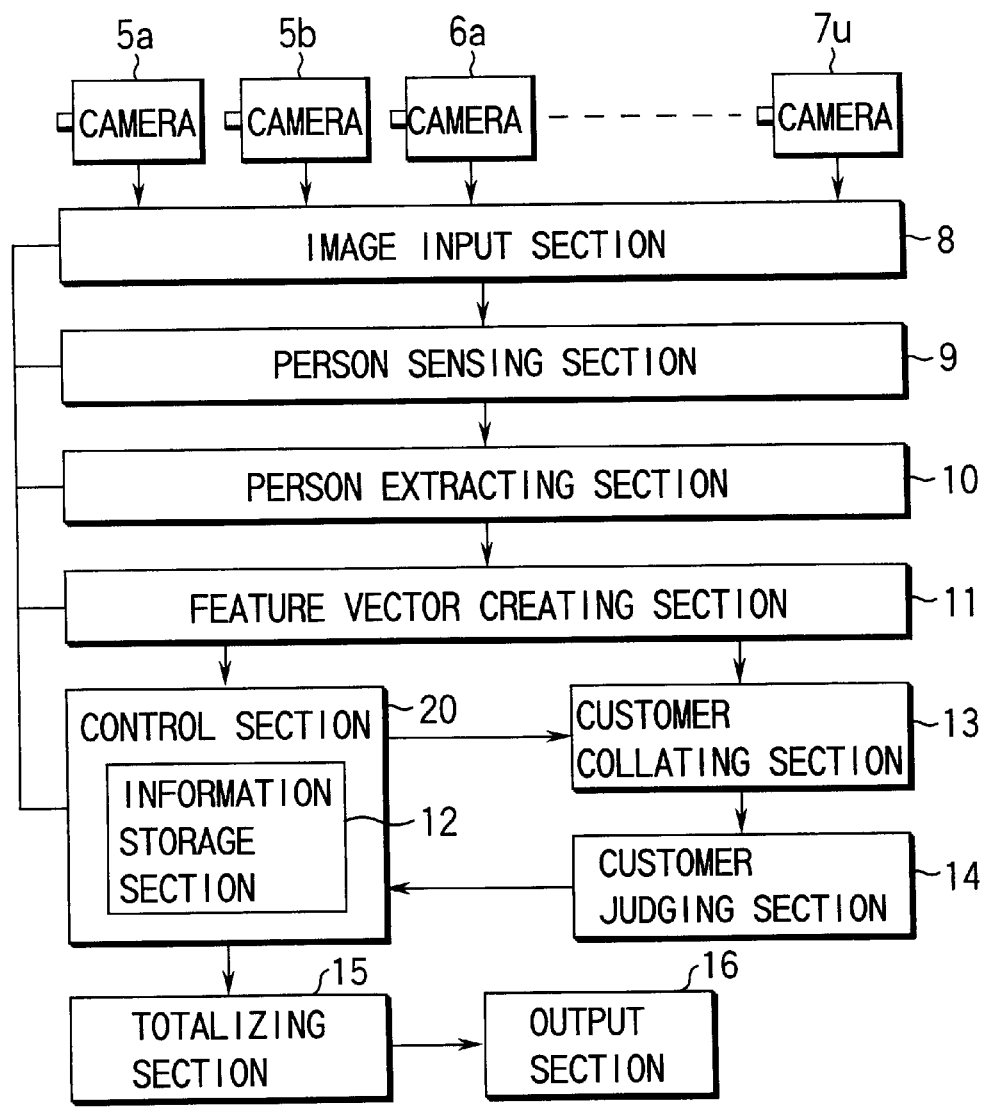
FIG. 2 is a block diagram showing the configuration of an acquisition device according to a first embodiment of the present invention.

FIG. 2 is a block diagram showing the configuration of a persons' traffic-line information acquisition device according to the present invention. A control section 20 comprehensively controls the individual sections included in the persons' traffic-line information acquisition device.

Under the control of the control section 20, an image input section 8 constantly takes in the images picked up by the cameras 5a, 5b, 6a, 6b, 7a to 7u. A person sensing section 9 senses the existence of a person, or a customer, from the image taken in by the image input section 8, and supplies the sense result to a person extracting section 10. The person sensing section 9 senses the existence of a person by, for example, determining the difference between the image taken in and the background image at each camera position previously taken.

The person extracting section 10 extracts only the face part of the person's image by removing the background part from the image from which the person sensing section 9 has sensed the existence of the customer and supplies the extracted person's face image to a feature vector creating section 11. The feature vector creating section 11 subjects the inputted person's face image to image processing and creates a feature vector unique to the customer. The feature vector is memorized in the information storage section 12 of the control section 20.

The feature vector creating section 11 compresses the multi-dimensional image data including a person's face image element into a lower-dimensional feature vector by principal component analysis. The number of dimensions k of the created feature vector is determined by the number of eigenvectors used for conversion in principal component analysis. The k eigenvectors can be determined from the covariance matrix of a sample image or the like in advance.

Alternatively, the feature vector creating section may extract the eyes, nose, mouth or the like previously set as parts of the face by using template images or the like and digitize the amount of feature, including the size of each part, color, and relative positional relations (for example, the distance between parts) to create a feature vector.

Figure 3:
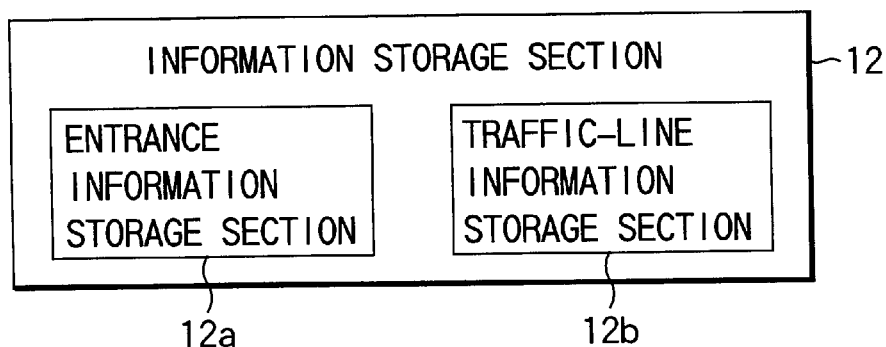
FIG. 3 shows the configuration of the information storage section in FIG. 2.

The information storage section 12 includes an entrance information storage section 12a and a traffic-line information storage section 12b as an entrance information storage section as shown in FIG. 3. The entrance information storage section 12a memorizes the feature vector created by the feature vector crating section 11 on the basis of the images supplied from the incomer cameras 5a, 5b. At this time, the entrance information storage section 12a, as shown in FIG. 5, memorizes pieces of entrance information created by adding the identification ID, entrance time, and entrance place to the feature vector. The identification ID is a serial code added to the customer each time he or she enters the store.

On the basis of the images supplied from the outgoer cameras 6a, 6b or the mover cameras 7a to 7u, the feature vector creating section 11 creates a feature vector. A customer collating section 13 acting as a person collating section collates that feature vector with the feature vector of each customer at the entrance time stored in the entrance information storage section 12a. Specifically, the feature vectors of the individual customers stored in the entrance information storage section 12a are read sequentially and the degree of resemblance to the just created feature vector is calculated. When the customer is the same person, the degree of resemblance is very high; otherwise the degree of resemblance is low.

After the degree of resemblance between the just created feature vector and the feature vectors of all the customers stored in the entrance information storage section 12a has been calculated at the customer collating section 13, a customer judging section 14 acting as a person judging section judges whether or not the customer just picked up is the same as any one of the customers stored in the entrance information storage section 12a. A judgment whether the same person or not is made by checking whether or not the degree of resemblance has exceeded a specific reference value.

When the customer judging section 14 judged that the customer is the same person, the traffic-line information is stored in the traffic-line information section 12b. Specifically, as shown in FIG. 6, the traffic-line information storage section stores the identification ID of the entrance information, the pickup time (i.e., passing time), and information on the pickup position as traffic-line information. The control section 20 stores pieces of the traffic line information in the traffic-line information storage section 12b in the order in which the customer judging section 14 has made judgments.

At a determined time or at regular intervals of time, a totalizing section 15 totalizes the entrance information stored in the entrance information storage section 12a of the information storage section 12 and the traffic-line information stored in the traffic-line information storage section 12b. At this time, the totalizing section 15 finds the traffic line of the customer by picking up pieces of the information with the same identification ID from the entrance information and traffic-line information. The traffic-line information found by the totalizing section 15 is supplied to an output section 16, such as a display unit or a printer, which outputs it.

Figure 4:
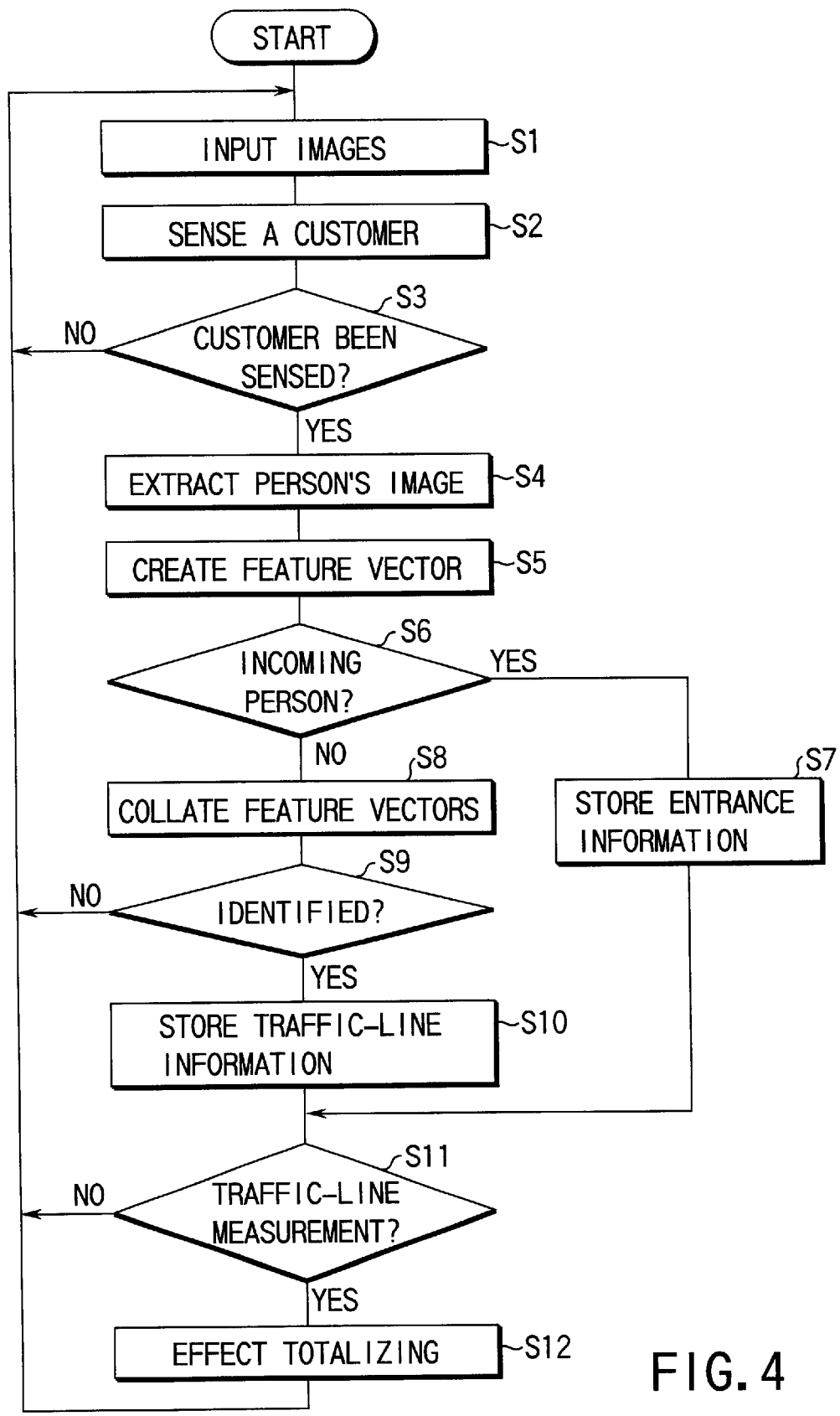
FIG. 4 is a flowchart to help explain the processing in the first embodiment.

FIG. 4 is a flowchart to help explain the operation of the persons' traffic-line information acquisition device constructed as described above. The operation is carried out under the control of the control section 20.

First, at step S1, the image input section 8 takes in images from the cameras 5a, 5b, 6a, 6b, and 7a to 7u. At step S2, the person sensing section 9 carries out the process of sensing customers. When a customer has been sensed, the person extracting section 10 extracts the person's face image at step S4. Then, at step S5, the feature vector creating section 11 creates a feature vector for the customer.

When the created feature vector for the customer is the feature vector created on the basis of the images from the incomer cameras 5a, 5b, the control section 20, at step S7, memorizes entrance information obtained by adding the serial identification ID, the entrance time, and entrance place to the feature vector, into the entrance information storage section 12a.

When the created feature vector for the customer is the feature vector created on the basis of the images from the outgoer cameras 6a, 6b or mover cameras 7a to 7u, the customer collating section 13, at step S8, collates the created feature vector with the feature vector for each customer at the time of entrance stored in the entrance information section 12a and calculates the degree of resemblance. At step S9, the customer judging means 14 identifies the customer as the same person on the basis of the degree of resemblance calculated by the customer collating section 13. When the customer has been identified as the same person, the control section 20, at step S10, stores the identification ID of the customer, the passing time, and the pickup place as traffic-line information in the traffic-line information storage section 12.

Thereafter, when the control section 20, at step S11, has judged the time of traffic-line measurement, the totalizing section 15, at step S12, totalizes the entrance information stored in the entrance information section 12a and the traffic-line information stored in the traffic-line information storage section 12b. At this time, the totalizing section 15 finds a traffic line for the customer by picking up pieces of the information with the same identification ID from the entrance information and traffic-line information.

Therefore, the entrance information as shown in FIG. 5 is stored in the entrance information storage section 12a and the traffic-line information as shown in FIG. 6 is stored in the traffic-line information storage section 12b. In FIGS. 5 and 6, for example, when identification ID "100001" has been picked up, it is judged as follows: the customer corresponding to the identification ID entered the stored at the doorway 1a at 10:00, passed the position of camera 7a at 10:01, passed the position of camera 7k at 10:03, passed the position of camera 7s at 10:06, passed the position of camera 7h at 10:10, and ten went out of the store at the doorway 1a. This provides a traffic line expressing the route the customer took. The traffic line is outputted on the output section 16, such as a display unit or printer, and is checked there.

As described above, in the first embodiment, the entrance and exist of a customer and the movement of him or her in the store are all picked up by the cameras, an identification ID is assigned to the picked-up customer's image, and pieces of information with the same identification ID are totalized, thereby producing the traffic line of the customer. Therefore, information on the traffic line of the customer can be acquired automatically and efficiently without imposing any burden on the customer. Information on the traffic line of each customer thus acquired is used as important materials in making a strategic. decision on store layout, display, clerk arrangement, and others in running a store.

Since the person extracting section 10 extracts only a person's face image, and the feature vector creating section 11 creates a feature vector for the face image and effects collation, the collating area is limited more than when the person's face image is extracted and collated. In addition, because the face, the most characteristic part of an individual, is collated, the discrimination rate of customers is increased.

Furthermore, since the feature vector creating section 11 compresses the multi-dimensional image data including a person's face image element into a lower-dimensional feature vector by principal component analysis, collation is carried out at higher speed and the storage capacity used for collation is reduced. Moreover, the face image of any person has the same layout and there is a strong correlation between images, the face image is expressed efficiently by linear connection of eigenvectors. This enables highly accurate collation using even lower-dimensional feature vectors.

Second Embodiment

Figure 7:
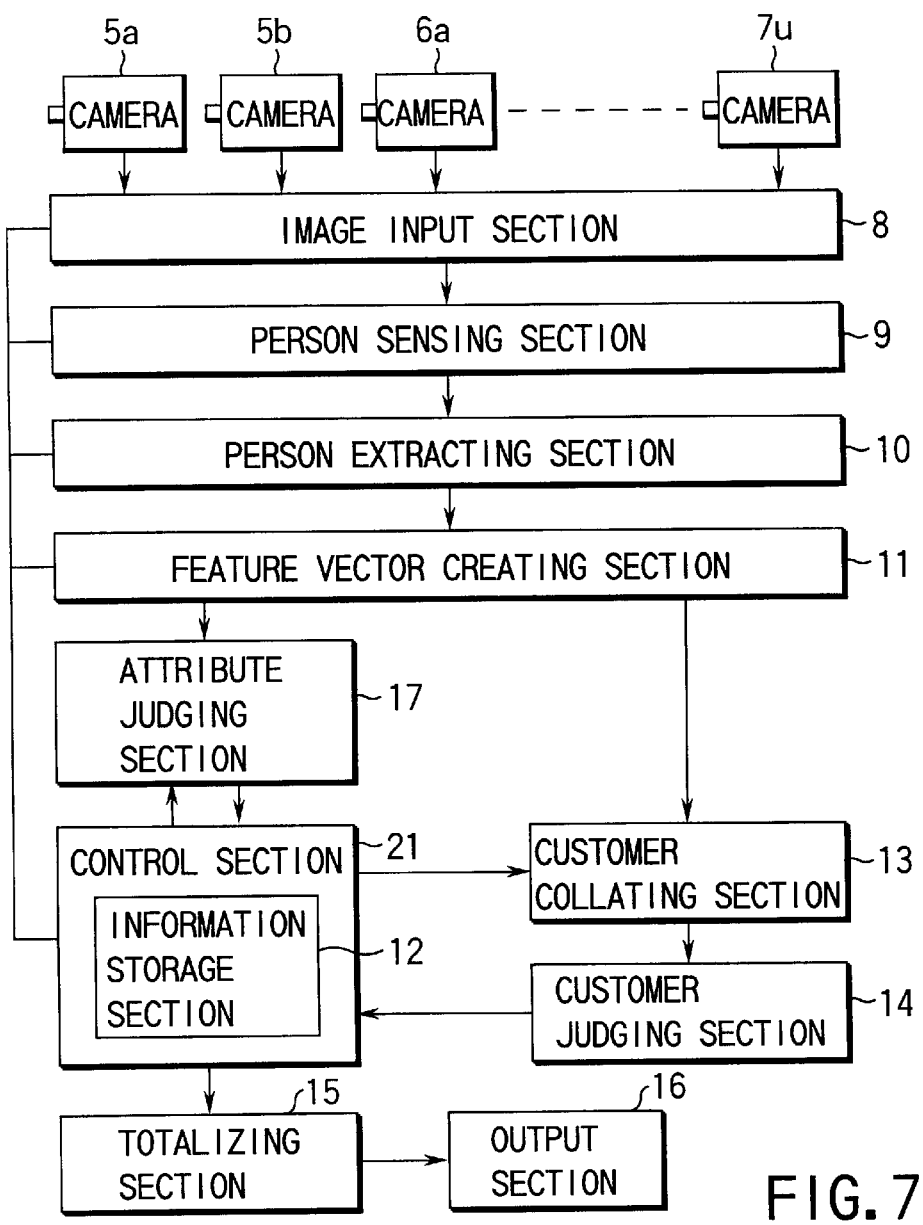
FIG. 7 is a block diagram showing the configuration of an acquisition device according to a second embodiment of the present invention.

A persons' traffic-line information acquisition device according to a second embodiment of the present invention will be explained. FIG. 7 is a block diagram showing the configuration of the persons' traffic-line information acquisition device according to the second embodiment. In FIG. 7, the same parts as those in the first embodiment are indicated by the same reference symbols. Explanation of what differs from the first embodiment will be given.

Figure 8:
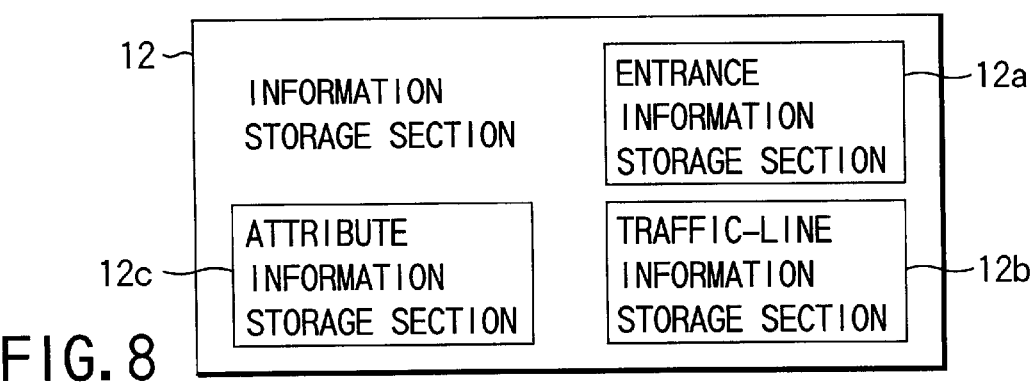
FIG. 8 shows the configuration of the information storage section in FIG. 7.

As shown in FIG. 7, in the second embodiment, an attribute judging section 17 is provided between the feature vector creating section 11 and the information storage section 12. The information storage section 12 is further provided with an attribute information storage section 12c shown in FIG. 8.

The attribute information storage section 12c stores feature vectors by person's attribute previously determined using sample images. For example, as shown in FIG. 10, the attribute information storage section 12c stores typical feature vectors by attribute for men in their twenties, men in their thirties, men in their forties, men in their fifties, men in their sixties or higher, women in their twenties, women in their thirties, women in their forties, women in their fifties, women in their sixties or higher.

The attribute judging section 17 collates the feature vector unique to the customer created by the feature vector creating section 11 at the time when the customer entered the store with the feature vector by attribute stored in the attribute information storage section 12c. The section 17 judges the attribute with the highest degree of resemblance to be the attribute for the customer.

Figure 9:
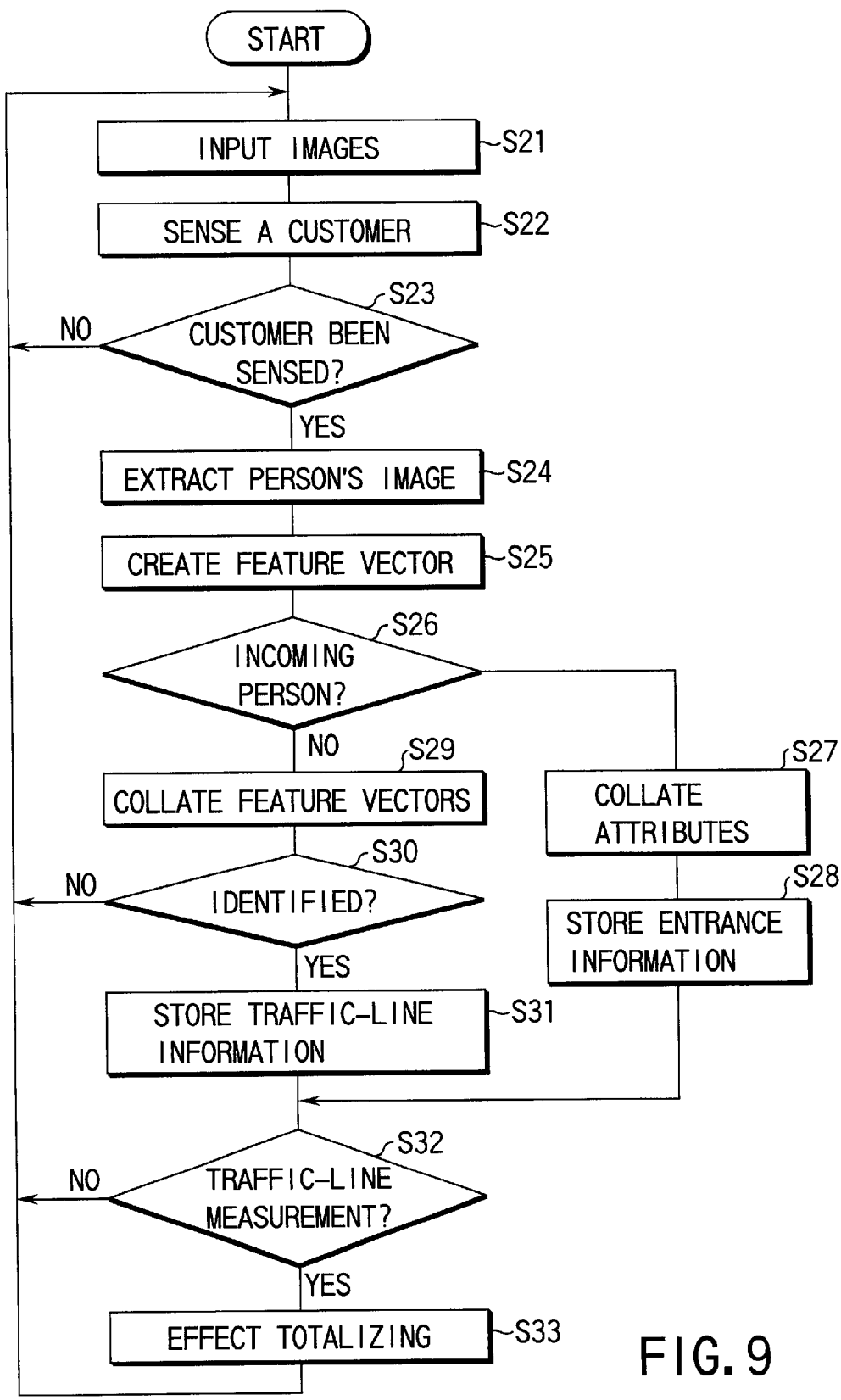
FIG. 9 is a flowchart to help explain the processing in the second embodiment.

FIG. 9 is a flowchart to help explain the operation of the persons' traffic-line information acquisition device constructed as described above. The operation is carried out under the control of the control section 21.

First, at step S21, the image input section 8 takes in images from the cameras 5a, 5b, 6a, 6b, and 7a to 7u. At step S22, the person sensing section 9 carries out the process of sensing customers. When a customer has been sensed, the person extracting section 10 extracts the person's face image at step S24. Then, at step S25, the feature vector creating section 11 creates a feature vector for the customer.

When the created feature vector for the customer is the feature vector created on the basis of the images from the incomer cameras 5a, 5b, the attribute judging section 17, at step S27, collates the created feature vector with the feature vectors by attribute stored in the attribute information storage section 12c and judges the attribute with the highest degree of resemblance to be the attribute for the customer. Then, at step S28, the control section 21 stores the entrance information in the entrance information storage section 12a. The entrance information is obtained by adding to the created feature vector not only the serial identification ID, entrance time, and entrance place, but also sex information and age information.

When the created feature vector for the customer is the feature vector created on the basis of the images from the outgoer cameras 6a, 6b or mover cameras 7a to 7u, the customer collating section 13, at step S29, collates the created feature vector with the feature vector for each customer at the time of entrance stored in the entrance information storage section 12a and calculates the degree of resemblance. At step S30, the customer judging section 14 discriminates the same person on the basis of the degree of resemblance calculated by the customer collating section 13. After the same person has been discriminated, the control section 21, at step S31, stores the customer's identification ID, passing time, and pickup position as traffic-line information into the traffic-line information storage section 12*b*.

Thereafter, when the control section 21, at step 32, has judged the time of traffic-line judgment, the totalizing section 15, at step S33, totalizes the entrance information stored in the entrance information storage section 12*a* and the traffic-line information stored in the traffic-line information storage section 12*b*. The totalizing section 15 picks up pieces of the information with the same identification ID from the entrance information and traffic-line information, thereby determining the traffic line for the customer.

Therefore, in the second embodiment, the totalized entrance information includes not only the attribute information by sex and age but also the features of the fist embodiment, enabling traffic-line information by sex and age to be also acquired automatically, which provides highly versatile materials in running a store.

While in the second embodiment, the attribute information has been information by sex and age, the present invention is, of course, not limited to this.

Third Embodiment

Figure 12:
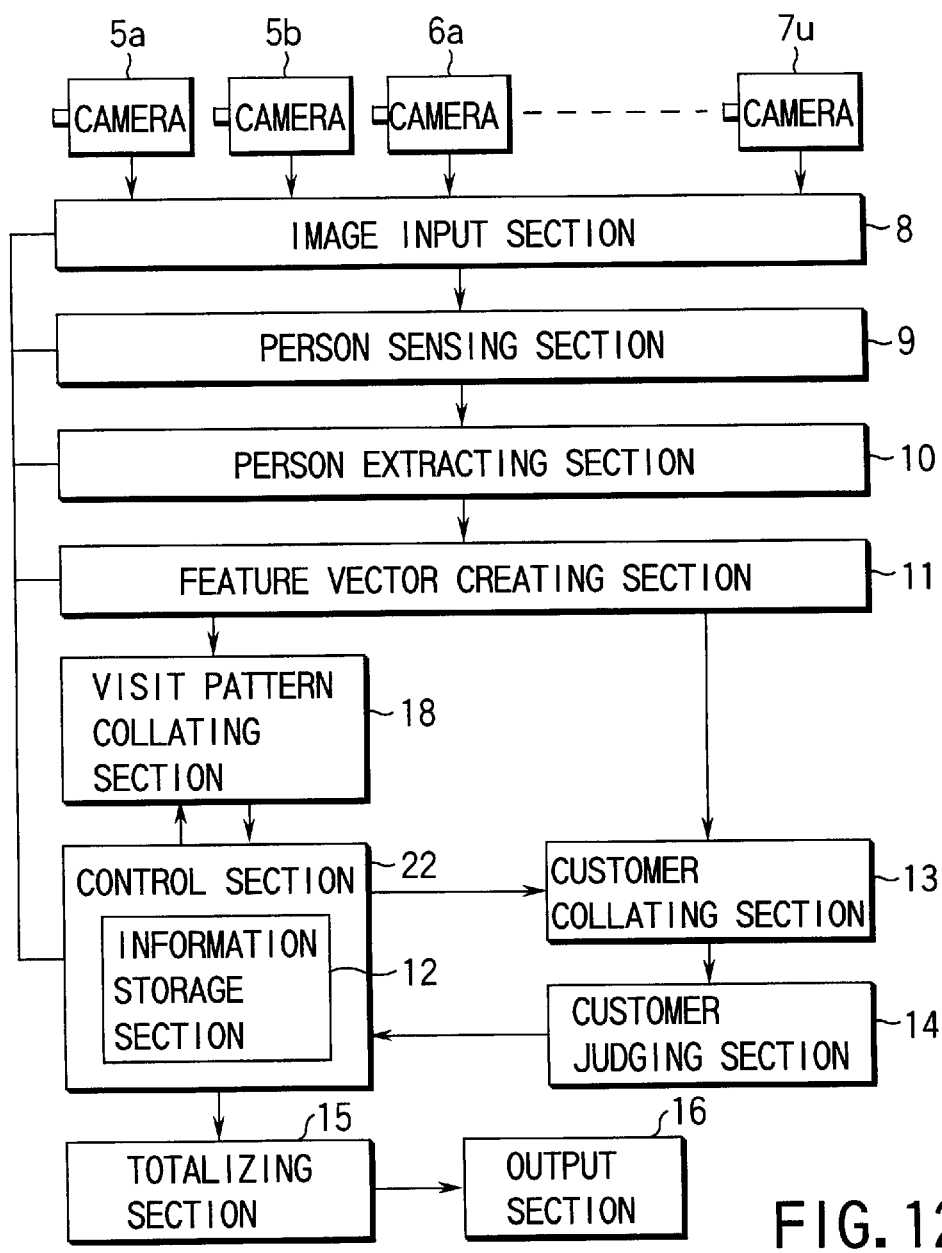
FIG. 12 is a block diagram showing the configuration of an acquisition device according to a third embodiment of the present invention.

A persons' traffic-line information acquisition device according to a third embodiment of the present invention will be explained. FIG. 12 is a block diagram showing the configuration of the persons' traffic-line information acquisition device according to the third embodiment. In FIG. 12, the same parts as those in the first embodiment are indicated by the same reference symbols. Explanation of what differs from the first embodiment will be given.

Figure 13:
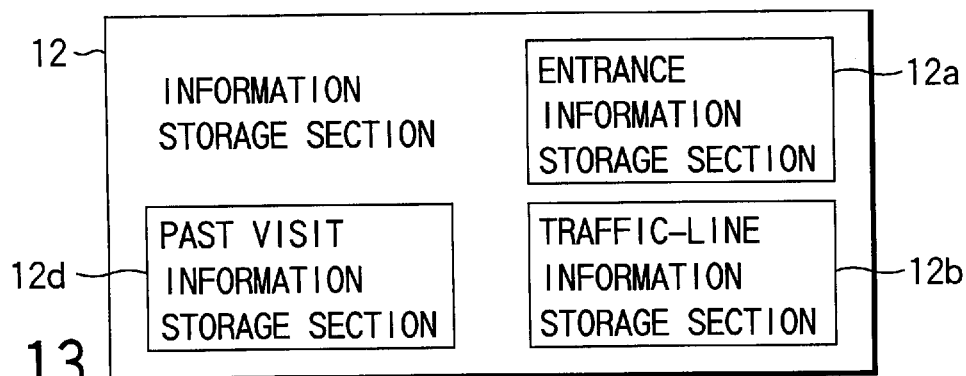
FIG. 13 shows the configuration of the information storage section in FIG. 12.

As shown in FIG. 12, in the third embodiment, an visit pattern collating section 18 is provided between the feature vector creating section 11 and the information storage section 12. The information storage section 12 is further provided with a past visit information storage section 12*d* shown in FIG. 13.

The past visit information storage section 12*d* memorizes past visit information D1 at regular intervals of, for example, one week or one month. The past visit information D1 is obtained by adding the visiting date to the entrance information stored in the entrance information storage section 12*a* as shown in FIG. 14A. The past visit information storage section 12*d* stores past traffic-line information D2 at regular intervals of, for example, one week or one month. The past traffic-line information D2 is obtained by adding the visit date to the traffic-line information stored in the traffic-line information storage section 12*b* as shown in FIG. 14B.

The past visit information storage section 12*d* memorizes information on the entrance of a customer, when the entrance information storage section 12*a* memorizes information on the entrance of the customer, when the customer leaves the store, or when a predetermined time has been reached. The past visit information storage section 12*d* memorizes information on the traffic line of a customer, when the traffic-line information storage section 12b memorizes information on the traffic line of the customer, when the customer leaves the store, or when a predetermined time has been reached.

Although in FIGS. 14A and 14B, pieces of entrance information and pieces of traffic-line information are put together into the respective groups for each entrance date to reduce the volume of information stored in the storage section 12*d*, the present invention is not restricted to this. For instance, the entrance date may be added to each piece of entrance information or each piece of traffic-line information.

Figures 15, 17:
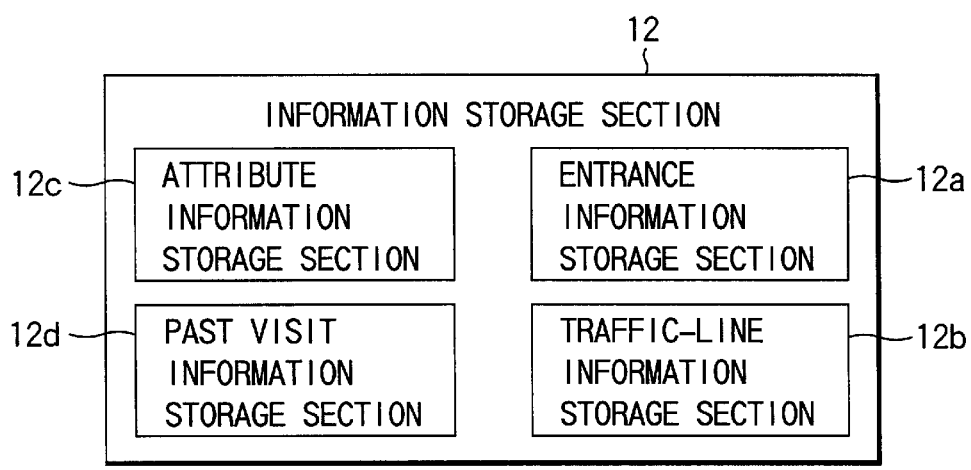
FIG. 15 shows an example of data the entrance information storage section memorizes in FIG. 13.
FIG. 17 shows the configuration of an information storage section according to a fourth embodiment of the present invention.

The visit pattern collating section 18 collates the feature vector unique to the customer created by the feature vector creating section 11 at the time when the customer entered the store with the feature vector (v) in the past entrance information D1 stored in the past incoming information storage section 12*d* in FIG. 14A. When the same person has been discriminated, the entrance information is stored in the entrance information storage section 12*a*. The entrance information is obtained by adding to the feature vector not only the identification ID, entrance time, and position information, but also the entrance date (d) and identification ID (e) for the same person stored in the past incoming information D1 as shown in FIG. 15.

Figure 16:
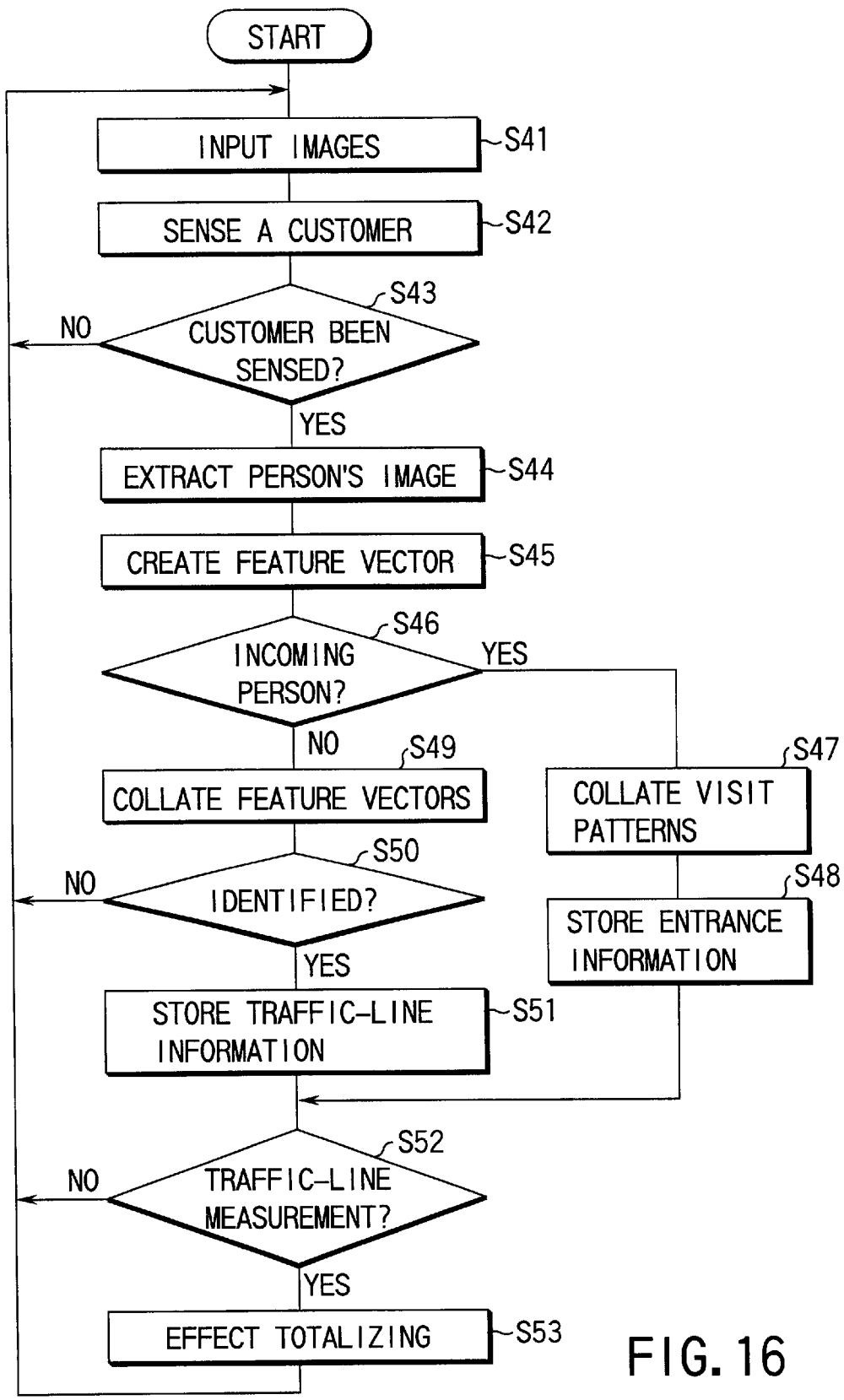
FIG. 16 is a flowchart to help explain the processing in the third embodiment.

FIG. 16 is a flowchart to help explain the operation of the persons, traffic-line information acquisition device constructed as described above. The operation is carried out under the control of the control section 22.

First, at step S41, the image input section 8 takes in images from the cameras 5*a*, 5*b*, 6*a*, 6*b*, and 7*a* to 7*u*. At step S42, the person sensing section 9 carries out the process of sensing customers. When a customer has been sensed, the person extracting section 10 extracts the person's face image at step S44. Then, at step S45, the feature vector creating section 11 creates a feature vector for the customer.

When the created feature vector for the customer is the feature vector created on the basis of the images from the incomer cameras 5*a*, 5*b*, the visit pattern collating section 18, at step S47, collates the created feature vector with the feature vector in the past visit information stored in the past visit information storage section 12*d*. The control section 20, at step S48, stores the entrance information into the entrance information storage section 12*a*. The entrance information is obtained by adding the serial identification ID, the entrance time, and the entrance place to the created feature vector. When the visit pattern collating section 18, at step S47, has discriminated the same person, the control section 22 stores the entrance information into the entrance information storage section 12*a*. The entrance information is obtained by adding to the feature vector not only the serial identification ID, entrance time, and entrance place, but also the preceding visit date of the corresponding person and the preceding identification ID.

When the created feature vector for the customer is the feature vector created on the basis of the images from the outgoer cameras 6*a*, 6*b* or mover cameras 7*a* to 7*u*, the customer collating section 13, at step S49, collates the created feature vector with the feature vector for each customer at the time of entrance stored in the entrance information storage section 12*a* and calculates the degree of resemblance. At step S50, the customer judging means 14 identifies the customer as the same person on the basis of the degree of resemblance calculated by the customer collating section 13. When the customer has been identified as the same person, the control section 22, at step S51, stores the identification ID of the customer, the passing time, and the pickup position as traffic-line information into the traffic-line information storage section 12*b*.

Thereafter, when the control section 22, at step S52, has judged the time of traffic-line measurement, the totalizing section 15, at step S53, totalizes the entrance information stored in the entrance information section 12*a* and the traffic-line information stored in the traffic-line information storage section 12b. At this time, the totalizing section 15 finds a traffic line for the customer by picking up pieces of the information with the same identification ID from the entrance information and traffic-line information.

In the third embodiment, the entrance information storage section 12a and past visit information storage section 12d have stored the past visit information including the preceding incoming date and preceding identification ID. Therefore, by tracing the past visit information D1 back on the basis of the preceding visit date and preceding identification ID, data on how many times a week or a month a customer visited the store and on what time the customer visited the store, and further on what day of the week the customer visits the store more frequently can be acquired.

Similarly, by tracing back the past traffic-line information D2 stored in the past visit information storage section 12d on the basis of the preceding visit date and preceding identification ID, the past traffic line of the same customer can be obtained. This makes it possible to analyze the correlation between the present traffic line and the past traffic line. On the basis of the visit information D1, the correlation between the visit pattern and the past traffic-line information D2 can be analyzed.

Consequently, the third embodiment provides more versatile materials in running a store. While in the third embodiment, the visit information includes the preceding visit date and preceding identification ID, the present invention is, of course, not limited to this.

Fourth Embodiment

A fourth embodiment of the present invention has the same configuration as that of the second embodiment of FIG. 7 except that the information storage section 12 includes not only the entrance information storage section 12a, traffic-line information storage section 12b, and attribute information storage section 12c but also a past visit information storage section 12d. The contents of the information stored in each of the entrance information storage section 12a, traffic-line information storage section 12b, and attribute information storage section 12c are the same as in the second embodiment.

The past visit information storage section 12d stores past visit information D11 at regular intervals of, for example, one week or one month. As shown in FIG. 18A, the past visit information D11 is obtained by adding the visit date to the entrance information including attribute information of FIG. 11. The past visit information storage section 12d further stores past visit information D12 at regular intervals of, for example, one week or one month. As shown in FIG. 18B, the past visit information D12 is obtained by adding the visit date to the traffic-line information stored in the traffic-line storage section 12b.

The past visit information storage section 12d memorizes information on the entrance of a customer, when the entrance information storage section 12a memorizes information on the entrance of the customer, when the customer leaves the store, or when a predetermined time has been reached. The past visit information storage section further 12d memorizes information on the traffic line of a customer, when the traffic-line information storage section 12b memorizes information on the traffic line of the customer, when the customer leaves the store, or when a predetermined time has been reached.

Although in FIGS. 18A and 18B, pieces of entrance information and pieces of traffic-line information are put together into the respective groups for each visit date to reduce the volume of information stored in the storage section 12d, the present invention is not restricted to this. For instance, the visit date may be added to each piece of entrance information or each piece of traffic-line information.

With this configuration, when the traffic-line measurement timing has been reached, the totalizing section 15 totalizes the entrance information stored in the entrance information storage section 12a and the traffic-line information stored in the traffic-line information storage section 12b. At this time, the totalizing section 15 acquires the traffic-line information for each customer by picking up pieces of the information with the same identification ID from the entrance information and traffic-line information.

Furthermore, the totalizing section acquires the traffic-line information by sex or age from the attribute information added to the entrance information. In addition, the totalizing section acquires the visit pattern by sex or age on the basis of the past attribute information by totalizing the visit date and visit time in the past entrance information stored in the past visit information storage section 12d on the basis of the attribute information. For example, data on the number of visitors by sex or age or the visit time zone can be acquired every week or month.

Furthermore, by totalizing the past traffic-line information stored in the past visit information storage section 12d on the basis of the attribute information, the traffic line by sex or age on the basis of the past attribute information can be acquired automatically, which makes it possible to automatically analyze the correlation between the present traffic line by attribute and the past traffic line by attribute.

Additionally, it is also possible to analyze the correlation between the visit pattern based on the attribute information added to the entrance information and the traffic line by attribute.

Consequently, the fourth embodiment provides more versatile materials in running a store. While in the fourth embodiment, the attribute information has been information by sex and age, the present invention is not restricted to this.

While in the above embodiments, the present invention has been applied to acquiring the traffic line for a customer entering a store and leaving the store, the invention is not necessarily limited to this.

Specifically, the invention may be applied to acquiring the traffic line of a person entering and leaving the facilities with doorways, such as exhibition facilities like an art museum or a theme park. For instance, when the invention is applied to an art museum, the arrangement of the exhibits or the optimum observation route can be examined to find the way to make the stream of persons smooth by using the acquired entrance information and traffic-line information. In addition, the entrance information and traffic-line information by attribute can be used as important materials for a future exhibition plan.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of acquiring information on a traffic line of persons representing routes taken by the persons, comprising:

sensing existence of respective persons and extracting images of the respectively sensed persons from images picked up by a plurality of image pickup devices which are provided in respective predetermined positions in a facility and which respectively pick up images of persons entering the facility, leaving the facility, and moving within the facility;

creating feature vectors unique to the respectively sensed persons by image-processing the extracted images of the persons entering the facility, leaving the facility, and moving within the facility;

adding information including an identification code and an entrance time to each of the feature vectors created with respect to the persons entering the facility to thereby create entrance information, and then storing the entrance information;

collating the feature vectors created with respect to the persons leaving the facility and moving within the facility with the feature vectors contained in said stored entrance information to thereby discriminate respective same persons;

storing traffic-line information including the identification codes of the respectively discriminated same persons, positions of the image pickup devices picking up images of the same persons, and times at which the image pickup devices have picked up the images of the same persons; and acquiring traffic-line information with a same identification code from the stored traffic-line information, determining respective positions of the same persons based on the positions of the image pickup devices picking up the images of the same persons, and providing a route of each person moving within said facility.

2. The method according to claim 1, wherein the extracted images are face images.

3. The method according to claim 1, wherein said feature vectors are lower-dimensional vectors created by principal component analysis.

4. The method according to claim 1, further comprising:
judging attributes of the respectively sensed persons,
wherein said feature vectors include said attributes and the collating is performed based on said attributes.

5. The method according to claim 4, wherein said attributes include the sex of said respectively sensed persons.

6. The method according to claim 4, wherein the route of each person is provided by attribute.

7. The method according to claim 1, further comprising:
preserving past visit information obtained by adding a visit date to said entrance information; and
collating subsequently created feature vectors with respect to persons entering the facility with the feature vectors included in said past visit information to discriminate respective same persons,
wherein when a same person is discriminated, the past visit date and a preceding identification code of said same person are added to the past visit information and preserved.

8. The method according to claim 7, further comprising:
providing a visit pattern including tendency data on frequency of visits and visit times of respective persons based on said past visit information.

9. The method according to claim 1, further comprising:
preserving past traffic-line information obtained by adding a visit date to said traffic-line information; and
referring to said past traffic-line information and providing a past route of each person moving around said facility.

10. The method according to claim 4, further comprising:
preserving past visit information obtained by adding a visit date to said entrance information.

11. The method according to claim 10, further comprising:
providing a visit pattern including tendency data by attribute on frequency of visits and visit times of respective persons based on said past visit information.

12. The method according to claim 10, further comprising:
preserving past traffic-line information obtained by adding a visit date to said traffic-line information; and
referring to said past traffic-line information and past visit information and providing a past route by attribute of each person moving around said facility.

13. A device for acquiring information on a traffic line of persons representing routes taken by the persons, comprising:

a plurality of image pickup devices which are provided in respective predetermined positions in a facility and which respectively pick up images of persons entering the facility, leaving the facility, and moving within the facility;

means for sensing existence of respective persons and extracting images of the respectively sensed persons from the images picked up by said image pickup devices;

means for creating feature vectors unique to the respectively sensed persons by image-processing the extracted images of the persons entering the facility, leaving the facility, and moving within the facility;

means for adding an identification code and an entrance time to each of the feature vectors created with respect to the persons entering the facility to thereby create entrance information, and for then storing the entrance information;

means for collating the feature vectors created with respect to the persons leaving the facility and moving within the facility with the feature vectors contained in said stored entrance information to thereby discriminate respective same persons;

means for storing traffic-line information including the identification codes of the respectively discriminated same persons, positions of the image pickup devices picking up images of the same persons, and times at which the image pickup devices have picked up the images of the same persons; and means for acquiring traffic-line information with a same identification code from the stored traffic-line information, determining respective positions of the same persons based on the positions of the image pickup devices picking up the images of the same persons, and providing a route of each person moving within said facility.

14. The device according to claim 13, wherein the extracted images are face images.

15. The device according to claim 13, wherein said feature vectors are lower-dimensional vectors created by principal component analysis.

16. The device according to claim 13, further comprising:
means for judging attributes of the respectively sensed persons, wherein said feature vectors include said attributes and the collating is performed based on said attributes.

17. The device according to claim 16, wherein said attributes include the sex of said respectively sensed persons.

18. The device according to claim 16, wherein the route of each person is provided by attribute.

19. The device according to claim 13, further comprising:

means for preserving past visit information obtained by adding a visit date to said entrance information; and means for collating subsequently created feature vectors with respect to persons entering the facility with the feature vectors included in said past visit information to discriminate respective same persons, wherein when a same person is discriminated, the past visit date and a preceding identification code of said same person are added to the past visit information and preserved.

20. The device according to claim 13, further comprising:

means for preserving past traffic-line information obtained by adding a visit date to said traffic-line information; and means for referring to said past traffic-line information and providing a past route of each person moving around said facility.

* * * * *